3,278,588
LOWER ALKANOYL ESTERS OF 4-HYDROXY-2-LOWER ALKYL CYCLOPENTANE-1,3-DIONES
Raphael Pappo, Skokie, Ill., assignor to G. D. Searle & Co., Chicago, Ill., a corporation of Delaware
No Drawing. Filed May 25, 1964, Ser. No. 370,101
4 Claims. (Cl. 260—488)

This application is a continuation-in-part of my copending application Serial No. 333,657, filed December 26, 1963.

The present invention is concerned with a new and novel process and with novel intermediates useful in that process. The process in question involves the conversion of 2-alkylcyclopentane-1,3,4-triones to the corresponding 2-alkylcyclopentane-1,3-diones and utilizes novel intermediates represented by the structural formula

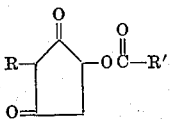

wherein R is a lower alkyl radical and R' can be hydrogen or a lower alkyl radical. The lower alkyl radicals contemplated by R and R' are exemplified by methyl, ethyl, propyl, butyl, pentyl, hexyl, and the branched-chain groups isomeric therewith.

The 2-alkylcyclopentane-1,3-diones produced by the instant process are of great importance in view of their utility as intermediates in total synthesis procedures for the manufacture of commercially valuable steroids. As has been described by Hughes et al., Chemistry and Industry, 1960, 1022, 2-methylcyclopentane-1,3-dione is converted by a series of steps to the female sex hormone, estrone. The latter substance is useful also as an intermediate to various medicinal agents, for example the progestational family of steriods exemplified by 17α-ethynyl-17β-hydroxyestr-5(10)-en-3-one.

A practical conversion of 2-methylcyclopentane-1,3,4-trione to the corresponding 1,3-dione has been the subject of investigation by workers for many years. Orchin and Butz, as reported at Journal of the American Chemical Society, 65, 2296 (1943) first studied the catalytic hydrogenation of that trione, using a platinum oxide catalyst. When ethyl acetate was the solvent employed, the sole product obtained in relatively poor yield, was 2-methyl-1,3-dioxocyclopentan-4-ol. The utilization of ethanol as the solvent resulted in the formation, as a minor product, of 2-methylcyclopentane-1,3-dione. In 1956, Nazarov et al., Zhur. Obschei. Khim., 26, 1482 (1956) confirmed the work of Orchin and Butz, obtaining almost identical yields. The reduction of the trione with potassium borohydride was reported by Panouse et al., Bull. Soc. Chim., 1955, 1036. The sole product obtained, in unspecified yield, was 2-methyl-1,3-dioxocyclopentan-4-ol.

The process of the present invention comprehends the unexpected findings that the 4-oxo group of 2-alkylcyclopentane-1,3,4-triones can surprisingly be selectively reduced by utilizing a palladium catalyst, thus affording the corresponding 4-hydroxy compounds in high yields, i.e., 90–100%, that those alcohols can readily be acylated with a lower alkanoic acid or with formic acid, and that the resulting 4-(lower alkanoate) or formate can be hydrogenolyzed with a palladium catalyst to produce the corresponding 2-alkylcyclopentane-1,3-diones. Overall yields of 70–80% are obtained by this process. The first step, involving hydrogenation of the 1,3,4-triones is optionally conducted in water or in an aqueous alkanol medium, such as aqueous ethanol or aqueous isopropyl alcohol, although the latter solvent system results in higher yields. Any palladium catalyst is suitable, those supported on carbon being preferred due to their greater activity. In the acylation step, it has been found that the addition of a small quantity of the alkanoic acid anhydride affords better yields, although the reaction proceeds well when the anhydride is omitted. Strong acids such as hydrogen chloride and sulfuric acid are the preferred catalysts for the acylation, hydrogen chloride being particularly preferred due to its ease of removal during the isolation procedure. The hydrogenolysis step can likewise be conducted in water or in an aqueous alkanol and in the presence of any palladium catalyst. The pressure under which both the hydrogenation and hydrogenolysis steps are conducted is not critical, atmospheric pressure being preferred for the sake of convenience of operation. It is unnecessary to purify the intermediate products, the crude materials being quite suitable for use in the succeeding step.

A specific example of the instant process involves the hydrogenation in aqueous isopropyl alcohol of 2-methylcyclopentane-1,3,4-trione, using a 5% or 10% palladium-on-carbon catalyst, acylation of the resulting 2-methyl-1,3-dioxocyclopentan-4-ol with acetic acid in the presence of catalytic quantities of hydrogen chloride and acetic anhydride, and hydrogenolysis of the thus produced 2-methyl-1,3-dioxocyclopentan-4-ol 4-acetate in aqueous isopropyl alcohol in the presence of a 5% or 10% palladium-on-carbon catalyst to yield the desired 2-methylcyclopentane-1,3-dione.

The novel intermediates of the present invention display anti-fungal properties. They are particularly effective as inhibitors of the growth of such organisms as *Candida albicans*.

The invention will appear more fully from the examples which follow. These examples are given by way of illustration only and are not to be construed as limiting the invention either in spirit or in scope to the details contained therein, as many modifications in materials and methods will be apparent from that disclosure to those skilled in the art. In these examples, temperatures are given in degrees centigrade (° C.) and quantities of materials in parts by weight unless otherwise noted.

*Example 1*

A mixture of 10 parts of 2-methylcyclopentane-1,3,4-trione monohydrate, one part of 10% palladium-on-carbon catalyst, and 125 parts by volume of 80% aqueous isopropyl alcohol is shaken in a hydrogen atmosphere at atmospheric pressure and room temperature until the uptake of hydrogen substantially ceases. Approximately 2½ hours are required. The catalyst is then removed by filtration, and the filtrate is distilled to dryness under reduced pressure. The resulting residue is recrystallized from the minimum quantity of water to afford pure 2-methyl-1,3-dioxocyclopentan-4-ol, melting at about 172–174°.

*Example 2*

A mixture of 21 parts of 2-methyl-1,3-dioxocyclopentan-4-ol and 1750 parts by volume of 5% hydrogen chloride in acetic acid is stirred at room temperature for about 12 hours until solution occurs. That solution is then kept at room temperature for about 2 days, at the end of which time the solvent is removed by distillation at reduced pressure and the residue is recrystallized from ether to afford 2-methyl-1,3-dioxocyclopentan-4-ol 4-acetate, melting at about 111–114°. A second recrystallization from ether affords a pure sample, melting at about 114.5–116°. This compound can be represented by the following structural formula

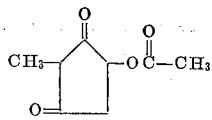

Example 3

A mixture of 2 parts of 2-methyl-1,3-dioxocyclopentan-4-ol 4-acetate, 0.4 part of 10% palladium-on-carbon catalyst, and 200 parts by volume of 70% aqueous isopropyl alcohol is stirred in a hydrogen atmosphere at room temperature and atmospheric pressure until the uptake of hydrogen substantially ceases. Filtration of the mixture removes the catalyst and affords a solution, which is stripped of solvent under reduced pressure, thus yielding a residue which is recrystallized from water to afford pure 2-methylcyclopentane-1,3-dione, melting at about 215–216.5°.

Example 4

A mixture of 20 parts of 2-methylcyclopentane-1,3,4-trione monohydrate, 2 parts of 10% palladium-on-carbon catalyst, and 200 parts by volume of 80% aqueous isopropyl alcohol is stirred in a hydrogen atmosphere at atmospheric pressure and room temperature until one molecular equivalent of hydrogen is absorbed. The catalyst is removed by filtration, and the filtrate is evaporated to dryness under reduced pressure to afford crude 2-methyl-1,3-dioxocyclopentan-4-ol, identical with the compound obtained by the procedure of Example 1.

The latter crude 4-hydroxy compound, amounting to 18.5 parts, is added to 2000 parts by volume of 5% hydrogen chloride in acetic acid, and the resulting mixture is stirred at room temperature for about 5 hours until solution is complete. At the end of that time, 11.8 parts of acetic anhydride is added, and the resulting reaction mixture is kept at room temperature for about 48 hours. The solvents are then removed by distillation at reduced pressure to afford 2-methyl-1,3-dioxocyclopentan-4-ol 4-acetate, identical with the product obtained in Example 2.

The latter acetate, amounting to 24.2 parts, is mixed with 4.8 parts of 10% palladium-on-carbon catalyst and 805 parts of 70% aqueous isopropyl alcohol, and that mixture is shaken with hydrogen at atmospheric pressure and room temperature until one molecular equivalent of hydrogen is absorbed. The required reaction time is approximately 5½ hours. The catalyst is then removed by filtration, and the filtrate is stripped of solvent under reduced pressure. The resulting residue is recrystallized from water to afford pure 2-methylcyclopentane-1,3-dione, melting at about 220–221.5°.

Example 5

A mixture of 16 parts of 2-methylcyclopentane-1,3,4-trione monohydrate, 16 parts of 10% palladium-on-carbon catalyst, and 200 parts by volume of 80% aqueous isopropyl alcohol is shaken with hydrogen at 30 pounds per square inch initial pressure and at room temperature until one molecular equivalent of hydrogen is absorbed. The reaction time required is approximately 4½ hours. Removal of the catalyst by filtration affords a filtrate which is evaporated to dryness under reduced pressure. Recrystallization of the resulting residue from water affords 2-methyl-1,3-dioxocyclopentan-4-ol, identical with the product of Example 1.

The latter 4-hydroxy compound, amounting to 14.2 parts, is added to 1600 parts by volume of 5% hydrogen chloride in acetic acid, and that mixture is kept at room temperature for about 3 hours, during which time the solid completely dissolves. To that mixture is then added 9 parts of acetic anhydride and storage at room temperature is continued for about 50 hours longer. The volatile materials are removed by distillation at reduced pressure, and the resulting residue is crystallized from ether to afford 2-methyl-1,3-dioxocyclopentan-4-ol 4-acetate, identical with the product of Example 2.

To the latter acetate is added 250 parts by volume of 70% aqueous isopropyl alcohol and 3 parts of 10% palladium-on-carbon catalyst, and that hydrogenation mixture is shaken with hydrogen at 30 pounds per square inch initial pressure and room temperature for about 5½ hours, during which time one molecular equivalent of hydrogen is absorbed. Removal of the catalyst by filtration and the solvent by distillation at reduced pressure affords a residue which is recrystallized from water to afford 2-methylcyclopentane-1,3-dione, melting at about 220–221°, and identical with the product of Example 3.

Example 6

A mixture of 10 parts of 2-ethylcyclopentane-1,3,4-trione, one part of 10% palladium-on-carbon catalyst and 250 parts by volume of 70% aqueous isopropyl alcohol is shaken with hydrogen at atmospheric pressure and room temperature until the uptake of hydrogen ceases. The catalyst is then removed by filtration, and the filtrate is stripped of solvent by distillation at reduced pressure. The residue thus obtained is recrystallized from water to afford pure 2-ethyl-1,3-dioxocyclopentan-4-ol, melting at about 138–142°.

Example 7

A mixture of 6.2 parts of 2-ethyl-1,3-dioxocyclopentan-4-ol and 500 parts by volume of 5% hydrogen chloride in acetic acid is allowed to stand at room temperature for about 87 hours, during which time the mixture becomes homogeneous. The solvent is then distilled under reduced pressure, and the resulting residue is crystallized from water to afford 2-ethyl-1,3-dioxocyclopentan-4-ol 4-acetate, melting at about 121–123°. This compound can be represented by the following structural formula

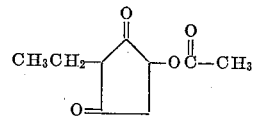

Example 8

A mixture of one part of 2-ethyl-1,3-dioxocyclopentan-4-ol 4-acetate, 0.2 part of 10% palladium-on-carbon catalyst, and 30 parts by volume of 70% aqueous isopropyl alcohol is shaken with hydrogen at atmospheric pressure and room temperature until the uptake of hydrogen ceases. This requires approximately 6½ hours. The catalyst is then removed by filtration, and the filtrate is evaporated to dryness under reduced pressure to afford a residue of the crude dione. Recrystallization of that crude material from water affords pure 2-ethylcyclopentane-1,3-dione, melting at about 175–177°.

Example 9

The substitution of an equivalent quantity of propionic acid in the procedures of Example 2 and Example 7 results in 2-methyl-1,3-dioxocyclopentan-4-ol 4-propionate and 2-ethyl-1,3-dioxocyclopentan-4-ol 4-propionate, respectively.

Example 10

A solution of 5 parts of 2-methyl-1,3-dioxocyclopentan-4-ol in 305 parts of formic acid is allowed to stand at room temperature for about 6 days, then is stripped of solvent by distillation under reduced pressure. The resulting crude product, melting at about 154–158°, is purified by recrystallization from dioxane to afford pure 2-methyl-1,3-dioxocyclopentan-4-ol 4-formate, melting at about 157–159°. This compound is represented by the following structural formula

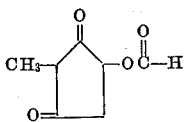

Example 11

To a solution of 3 parts of 2-methyl-1,3-dioxocyclopentan-4-ol 4-formate in 50 parts by volume of 70% aqueous isopropyl alcohol is added 0.6 part of 10% palladium-on-carbon catalyst, and the resulting mixture is shaken in a hydrogen atmosphere at atmospheric pressure and room temperature until hydrogen is no longer absorbed. The catalyst is removed by filtration, and the solvent is distilled under reduced pressure to afford the crude dione, which is purified by recrystallization from hot water to afford 2-methylcyclopentane-1,3-dione, identical with the product obtained in Example 3.

What is claimed is:
1. A compound of the formula

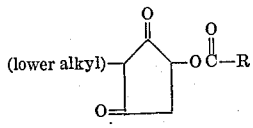

wherein R is selected from the group consisting of hydrogen and a lower alkyl radical.
2. 2-Methyl-1,3-dioxocyclopentan-4-ol 4-acetate.
3. 2-Ethyl-1,3-dioxocyclopentan-4-ol 4-acetate.
4. 2-Methyl-1,3-dioxocyclopentan-4-ol 4-formate.

References Cited by the Examiner
UNITED STATES PATENTS

| 2,018,213 | 10/1935 | Klingenfuss | 260—586 |
| 2,363,928 | 11/1944 | Ballard et al. | 167—30 |
| 2,582,743 | 1/1952 | Bollmann et al. | 260—488 |
| 2,811,558 | 10/1957 | Sannie et al. | 260—586 |
| 3,210,407 | 10/1965 | Chinn | 260—488 |

OTHER REFERENCES

Orchin et al.: J. Amer. Chem. Soc., 65, 2296 (1943).

References Cited by the Applicant

Nazarov et al.: Zhur. Obschei. Khim, 26, 1482 (1956).
Orchin and Butz.: J. Am. Chem. Soc., 65, 2296 (1943).
Panouse et al.: Bull. Soc. Chim., 1955, 1036.

LORRAINE A. WEINBERGER, *Primary Examiner.*

V. GARNER, *Assistant Examiner.*